United States Patent [19]

Pfeil et al.

[11] Patent Number: 5,908,902
[45] Date of Patent: Jun. 1, 1999

[54] SELF-EMULSIFYING AQUEOUS EPOXY RESIN DISPERSIONS

[75] Inventors: Armin Pfeil, Kaufering; Dieter Dreischhoff, Wiesbaden; Claus Godau, Kiedrich, all of Germany

[73] Assignee: Hoechst Aktiengesellschaft, Frankfurt am Main, Germany

[21] Appl. No.: 08/660,360

[22] Filed: Jun. 7, 1996

[30] Foreign Application Priority Data

Jun. 8, 1995 [DE] Germany ............................ 195 20 854

[51] Int. Cl.$^6$ .................................................. C08F 283/10
[52] U.S. Cl. ............................ 525/524; 523/404; 528/89; 528/103
[58] Field of Search ........................... 523/404; 525/524; 528/89, 103

[56] References Cited

U.S. PATENT DOCUMENTS

| | | | |
|---|---|---|---|
| 4,886,845 | 12/1989 | Beuker et al. ........................... | 523/403 |
| 4,987,163 | 1/1991 | Becker et al. ........................... | 523/414 |
| 5,236,974 | 8/1993 | Dreischhoff et al. ................... | 523/403 |
| 5,500,461 | 3/1996 | Young ..................................... | 523/404 |
| 5,523,336 | 6/1996 | Schrieber et al. ....................... | 523/406 |

FOREIGN PATENT DOCUMENTS

| | | |
|---|---|---|
| 109 173 | 5/1984 | European Pat. Off. . |
| 0353103 | 1/1990 | European Pat. Off. . |

*Primary Examiner*—Robert Dawson
*Assistant Examiner*—D. Aylward
*Attorney, Agent, or Firm*—Foley & Lardner

[57] ABSTRACT

A self-emulsifying epoxy resin (A), prepared from proportions by mass of (A-1) from 50 to 95% of one or more epoxide compounds having at least two epoxide groups per molecule and an epoxide group content of from 300 to 11,200 mmol/kg;

(A-2) from 5 to 50% of an aromatic polyol;

(A-3) from 0 to 25% of modifying compounds having at least two epoxide-reactive groups;

(A-4) from 5 to 25% of an emulsifying product of the condensation of (A-4-a) an aliphatic polyol having a weight-average molar mass $M_W$ of from 200 to 20,000 g/mol and (A-4-b) an epoxide compound having at least two epoxide groups per molecule and an epoxide group content of from 500 to 10,000 mmol/kg, whereby the ratio of the number of OH groups to the number of EP groups is from 1:2 to 1:10 and the epoxide group content of these condensation products (A-4) is between 100 and 6700 mmol/kg.

11 Claims, No Drawings

SELF-EMULSIFYING AQUEOUS EPOXY RESIN DISPERSIONS

BACKGROUND OF THE INVENTION

1. Field of the Invention

The present invention relates in general to self-emulsifying epoxy resins that are useful in dispersions suitable for: coatings applications; matt clear-coats having good adhesion to a wide variety of substrates, high hardness and good resistance properties; electrodeposition coatings; water-dilutable adhesives; and as additives to polymer cements.

2. Description of Related Art

It is known to prepare stable, aqueous dispersions of synthetic resins by emulsifying corresponding monomers or oligomers in an aqueous medium, using appropriate auxiliaries (emulsifiers), and then carrying out a polymerization reaction. By using this known reaction sequence, it is possible, for example, to prepare aqueous dispersions of acrylate resins by emulsion polymerization. In the case of condensation products, such as epoxy resins, which are difficult or even impossible to prepare by emulsion condensation, it is necessary, however, to prepare aqueous dispersions by first synthesizing the resin and then dispersing it in water. Such secondary dispersions require greater quantities of emulsifier, separate after only a short time and in general also display poor film-forming properties.

EP-A 0 051 483 describes and claims epoxy resin dispersions of self-emulsifying epoxy resins, which comprise polyalkylene glycol glycidyl ethers and also, if desired, a monoepoxide as reactive diluent. The maximum particle size of this dispersion is described as being about 3 µm. Films produced from these dispersions and suitable curing agents possess, owing to the content of the relatively slow-reacting polyalkylene glycol glycidyl ethers and, if appropriate, monoepoxides which act as chain terminators, a relatively soft surface which restricts the utility of the epoxy dispersions described in this document.

U.S. Pat. No. 4,423,201 describes the preparation of self-emulsifying epoxy resins from diglycidyl ethers of aromatic polyols, from aromatic polyols and from reaction products of long-chain aliphatic polyether glycols with diisocyanates and aromatic polyols. The dispersion of these resins in water, however, is possible only with the aid of relatively large quantities of organic solvents, and in addition the particle sizes obtained are relatively high. The coatings produced using these epoxy resin dispersions, moreover, are relatively soft.

In Patent EP-B 0 272 595, proposals have already been made for aqueous dispersions based on specific self-emulsifying epoxy resins, which couple good storage stability with a low content of organic solvents and produce coatings having good surface properties. The coatings produced with these dispersions, however, have a tendency after a long time to become brittle, thereby adversely affecting technological properties such as, for example, elasticity or the anticorrosion effect.

EP-A 0 530 602 describes improved variants (based on flexibilized epoxy resins) of system 1, which are outstandingly suitable for aqueous anticorrosion coatings and can be prepared almost or even completely without solvents. A disadvantage of these dispersions, however, is their low shear stability, since they are externally emulsified systems.

For both of the above-mentioned systems, a specific emulsifier is obtained by condensing an aliphatic polyol having a number-average molar mass $M_n$ of from 200 to 20,000 g/mol with an epoxide compound having at least two epoxide groups per molecule and an epoxide group content of from 10,000 to 500 mmol/kg ("epoxide equivalent weight" EEW of from 100 to 2000 g/mol). In this system, the ratio of the number of OH groups to the number of epoxide groups is from 1:0.85 to 1:3.5 and the epoxide group content of this condensation product is between 200 and 2.5 mmol/kg (EEW 5000 to 400,000 g/mol). The synthesis of these products requires careful reaction control and also reactive catalysts, residues from which remain in the aqueous dispersion and may impair its long-term storage stability.

In the first case, this emulsifier is already present during resin synthesis and is evidently incorporated to a certain degree, by the slow-reacting secondary OH groups, into the epoxy resin. This system can therefore be referred to as being self-emulsifynig, and the expression "self-emulsifying" as it is used throughout this description, will denote this type of system. In the second case, the emulsifier is mixed in after resin synthesis, i.e. the system is externally emulsified. This difference manifests itself in particular in the shear stability, which for the second system is markedly poorer than for the first In both cases, however, the advantages of nonionic stabilization are evident, for example, in lack of sensitivity to electrolytes and in high storage stability.

The addition of solvents is necessary for technical reasons related on the one hand to the process, and related on the other hand to practical application. The "water hill" which occurs during phase inversion, i.e. the very high viscosity maximum, must be lowered by diluent additives, generally appropriate solvents, or by flexibilization of the resin in order for dispersion to succeed. For systems which cure at room temperature, moreover, the solvent acts as a coalescence agent to ensure flawless film formation.

The latter dispersions, especially those of EP-A 0 530 602, already have a markedly reduced solvent content with improved practical use properties. In the context of the ever more pressing need to minimize volatile organic components (VOCs) in aqueous coating compositions, however, even the reduced solvent content is a problem. Moreover, flexibilization of the base resin requires the use of expensive raw materials, which may in addition have adverse effects on the set of properties.

Systems which cure at room temperature, such as those for preventing corrosion and protecting buildings, or those which are subjected to forced drying, must be viewed particularly critically from the standpoint of solvent emission, since with these systems it is not possible, as in stoving units, to carry out thermal incineration of the solvent. A further improvement to the existing systems would, therefore, include a binder based on a completely solvent-free dispersion which could be used for room temperature-curing coatings.

From the viewpoint of practical use, the solvents employed serve predominantly as coalescence agents, which evaporate slowly from the film after it is formed, thereby giving rise to conditions unfavorable from the standpoint of occupational health and to the unwanted emission of organic constituents into the atmosphere. In addition, it is inevitable that solvent residues remain in the coating, and have an adverse effect on its properties. Without such solvents, however, the result is poor film formation and poor leveling, leading to turbid, poorly adhering films.

The application DE-A 43 27 493 describes a process by which it is possible to produce completely solvent-free dispersions. Instead of adding a solvent, free-radically polymerizable monomers (for example (meth)acrylates, styrene (derivatives), vinyl compounds, etc.) are added to the base resin and dispersion is then carried out in a customary manner. Once the dispersion has been obtained, emulsion polymerization is initiated in order to obtain by this means a completely solvent-free epoxy resin dispersion with a certain polymer dispersion component. These systems are of particular interest for stoving applications, since they show outstanding leveling, without addition of solvent, on curing with acids, melamine resins, etc.

That reactive diluents can have a positive effect (reducing viscosity) in conventional epoxy resin formulations and water-dilutable liquid resins is known to the person skilled in the art. Virtually no description has been given, however, of their use in dispersions of solid epoxy resin. U.S. Pat. Nos. 4,315,044, 4,399,242 and 4,608,406 describe the use of $C_8$–$C_{80}$-alkyl monoepoxides in nonionically stabilized dispersions of solid epoxy resins, for curing at room temperature or with heating. In these patents, the reactive diluents are stirred into the finished dispersion where they improve the shear stability, the freeze-thaw stability, the storage stability and the gloss of the coatings, although this can only be achieved satisfactorily by the additional use, in some cases, of glycols or glycol ethers. In contrast, nothing is said about the function of the reactive diluents as coalescence agents, with no mention in particular to the fact that the addition of the reactive diluent to the resin prior to the actual dispersion process is particularly advantageous.

The subsequent admixing of substances to a finished, nonionically stabilized dispersion of solid resin, especially when the dispersions have a high solids content by mass, is highly laborious, since it is necessary to carry out thorough homogenization of components of different viscosities and different polarities with one another, a process which cannot be achieved satisfactorily in relatively large mixing units. Furthermore, it is not possible in this way to achieve such a high degree of mixing of resin and reactive diluents, since these components are in separate micelles.

Reactive diluents can therefore be used in order to control the practical use properties of the dispersion, for example reducing the minium film-forming temperature, extending the processing time, improving gloss, shear stability and stability to freeze-thaw cycles, and exerting controlled influence over hardness and elasticity. Their advantage over the use of organic solvents is that these reactive diluents are incorporated into the film in the course of the curing reaction and therefore do not lead to the unwanted emission of organic components, thereby meeting the requirement for a low- or no-solvent system. Adding the reactive diluent before the dispersion process has the substantial advantage that with little effort it is much better emulsified than in the case of subsequent addition to the finished dispersion, leading to enhanced coating quality. In this case, reactive diluents and the base resin are in joint micelles, which cannot be achieved by subsequent, homogeneous incorporation of the reactive diluents. The content of reactive diluent can be apportioned to the solids content of the binder or coating material.

Thus, there exists a need to develop epoxy resins and self-emulsifying dispersions prepared therefrom whose emulsifying component is simple to prepare. There also exists a need to prepare these systems having particularly low-solvent contents, if desired, which can be achieved by use of reactive diluents.

SUMMARY OF THE INVENTION

It is therefore an object of the present invention to provide epoxy resins and self-emulsifying dispersions prepared therefrom whose emulsifying component is simple to prepare. It is an additional object of the invention to prepare these systems having a particularly low-solvent content, if desired, which can be achieved by the use of reactive diluents.

It also is an object of the invention to provide methods of making epoxy resins and self-emulsifying dispersions that do not suffer from the drawbacks described above with respect to the dispersions described in the background literature. It is a further object of the present invention to provide coating compositions and methods of using these coatings to coat a variety of surfaces, whereby the coating compositions include a self-emulsifying epoxy resin, curing agent and conventional additive.

In accordance with these and other objects of the invention, there is provided a self-emulsifying epoxy resin (A) and a stable, aqueous epoxy resin dispersion (I) prepared therefrom, where the self-emulsifying epoxy resin comprises an epoxy resin prepared from (in proportions by mass):

(A-1) from 50 to 95%, preferably from 55 to 85% by mass, of one or more epoxide compounds having at least two epoxide groups per molecule and an epoxide group content of from 300 to 11,200-mmol/kg (epoxide equivalent weight of from 90 to 3000 g/mol);

(A-2) from 5 to 50%, preferably from 15 to 45% by mass, of an aromatic polyol;

(A-3) from 0 to 25%, preferably from 1 to 10% by mass, of modifying compounds having at least two epoxide-reactive groups; and (A-4) from 5 to 25%, preferably from 10 to 20% by mass, of an emulsifying product of the condensation of (A-4-a) a preferably aliphatic polyol having a weight-average molar mass $M_W$ of from 200 to 20,000 g/mol, and (A-4-b) an epoxide compound having at least two epoxide groups per molecule and an epoxide group content of from 500 to 10,000 mmol/kg (epoxide equivalent weight from 100 to 2000 g/mol), where the ratio of the number of OH groups to the number of epoxide groups (EP groups) is from 1:2 to 1:10, preferably from 1:4 to 1:8, and the epoxide group content of these condensation products is between 100 and 6700-mmol/kg (epoxide equivalent weights from 150 g/mol to 8000 g/mol), preferably between 1000 and 4000 mmol/kg (EEW from 250 g/mol to 1000 g/mol);

In accordance with another object of the present invention, there is provided a stable, aqueous epoxy resin dispersion (I) prepared from the self-emulsifying epoxy resin described above, where the dispersion comprises:

(A) from 30 to 90% by mass, preferably from 40 to 85% by mass, of the self-emulsifying epoxy resin (A);

B) from 0 to 20%, preferably from 1 to 15% by mass, of surfactants, preferably nonionic surfactants;

(C) from 0 to 20%, preferably from 1 to 15% by mass, of a reactive diluent selected from one or more of the following compounds from the group of (C-1) low molar mass, liquid epoxy-fuictional compounds, and (C-2) polymers of ethylenically unsaturated, otherwise inert or, if desired, finctional monomers which are capable of free-radical polymerization or copolymerization;

(D) from 0 to 25%, preferably from 1 to 20% by mass, of inert organic solvents; and (E) from 5 to 70%, preferably from 10 to 60% by mass, of water, whereby the sum of the proportions by mass is 100%.

In accordance with other objects of the present invention, there are provided methods of making the self-emulsifying epoxy resin (A) and the stable, aqueous epoxy resin dispersion (I) described above, as well as coating compositions that include the epoxy resin (A) in addition to curing agents and other conventional coating composition additives.

The epoxy resins (A) which have been modified by emulsifying compounds of type (A-4) can in accordance with the invention have an epoxide group content of from 50 to 2500 mmol/kg (epoxide equivalent weight EEW from 400 to 20,000 g/mol), for systems which cure at room temperature, and can preferably have an epoxide group content of from 1000 to 2500 mmol/kg (EEW from 400 to 1000 g/mol). In contrast, for thermal curing, which takes place by way of the secondary OH groups of the resin, it is preferable to use epoxide group contents of below 1700 mmol/kg (EEW above 600 g/mol).

Emulsifiers of type (A-4) are known per se and are described, for example in DE-A 43 10 198, U.S. Pat. No. 4,419,467 and EP-A 0 493 916. In contrast, however, their use as an emulsifier which is incorporated into the resin has not previously been described, and thus, the epoxy resin dispersions based on such resins form a part of the present invention. Accordingly, the use of the compounds (A-4) as built-in emulsifiers and the epoxy resin dispersions based thereon are likewise provided by the present invention.

In accordance with the above-mentioned objectives, the present invention additionally provides a process for the preparation of an aqueous epoxy resin dispersion (I), which comprises first preparing the emulsifying component (A-4) and then the epoxy resin (A) by condensation of components (A-1), (A-2) and, if appropriate, (A-3) with (A-4) at elevated temperatures in the presence of condensation catalysts. The diluent (C-1) then can be added at a lower temperature, subsequently effecting homogeneous incorporation of, if desired, additional dispersant (B) and, if desired, of solvent (D), and finally obtaining an aqueous dispersion by adding water (E) in the portions described herein.

In accordance with further objects of the present invention there is provided a process for the preparation of an aqueous epoxy-polyacrylate dispersion (I), which comprises initially preparing the emulsifying component (A-4) and then the epoxy resin (A) by condensation of components (A-1), (A-2) and, if desired, (A-3) with (A-4) at elevated temperatures in the presence of condensation catalysts as described above. At least a portion of the diluent (C) then can be added at a lower temperature, allowing partial reaction of the monomers (C-2) with the epoxy resin (A) to take place, if desired, then effecting homogeneous incorporation of, if desired, the dispersant (B) and, if desired, solvent (D), and obtaining an aqueous dispersion by adding water (E) in the proportions described above. Then, using an appropriate initiator system and, if appropriate, adding the remainder of the diluent (C), the monomers (C-2) can be polymerized in an emulsion polymerization process at appropriate temperatures, to provide a polymer dispersion. The portions of diluent which are used if desired can be of varying composition with respect of the nature and quantity of the constituents (C-1) and (C-2).

In accordance with additional objects of the invention, there is provided aqueous coating compositions using the dispersions (I) according to the invention, comprising (in proportions by mass):

(I) from 40 to 90%, preferably from 50 to 85%, of the epoxy resin dispersion according to the invention, (II) from 10 to 60%, preferably from 15 to 55%, of an aqueous curing agent which is suitable for curing at room temperature, at elevated temperatures (forced drying) or under stoving conditions; and, if desired, (III) from 0 to 40%, preferably from 5 to 35%, of customary additives, fillers, pigments and catalysts.

Binders of the invention can be prepared by mixing the dispersion with an appropriate curing agent (II), followed if desired by additives according to (III) which are known to the person skilled in the art.

These and other objects of the present invention will be readily apparent to those skilled in the art upon review of the detailed description of the preferred embodiments that follows.

DETAILED DESCRIPTION OF THE PREFERRED EMBODIMENTS

Throughout this description, the expression "self-emulsifying" insofar as it refers to the epoxy resin (A) denotes an epoxy resin wherein the emulsifier is already present during resin synthesis and is incorporated to a certain degree into the resin by the slow-reacting secondary OH groups.

The epoxide compounds according to (A-1) and (A-4-b) can be any polyepoxides having on average at least two epoxide groups per molecule. These epoxide compounds may be either saturated or unsaturated and may be aliphatic, cycloaliphatic, aromatic and/or heterocyclic, and may also contain hydroxyl groups and polyether units. Moreover, they may comprise those substituents and/or finctional groups which do not bring about any troublesome secondary reactions under the conditions of mixing or reaction, examples being alkyl or aryl substituents, ether groups and the like.

They are preferably polyglycidyl ethers based on polyhydric, preferably dihydric, alcohols, phenols, hydrogenation products of these phenols, and/or on novolaks (reaction products of mono- or polyhydric phenols with aldehydes, especially formaldehyde, in the presence of acidic catalysts). In one variant, hydroxy compounds with a finctionality of three or more are mixed with the preferred divalent compounds, so that the average epoxide functionality of components (A-1) or (A-4-b) is more than two. The epoxide group content of these epoxide compounds is preferably between 500 and 10,000 mmol/kg (EEW from 100 to 2000 g/mol), in particular between 2800 and 10,000 mmol/kg (EEW from 100 to 350 g/mol).

Examples of suitable polyhydric phenols include resorcinol, hydroquinone, 2,2-bis(4-hydroxyphenyl)propane (bisphenol A), dihydroxydiphenylmethane (bisphenol F, possibly isomer mixtures), tetrabromobisphenol A, 4,4'-dihydroxy-diphenylcyclohexane, 4,4'-dihydroxy-3,3'-dimethyldiphenylpropane, 4,4'-dihydroxybiphenyl, 4,4'-dihydroxybenzophenone, 1,1-bis(4-hydroxyphenyl)ethane, 2,2-bis [4-bis[4-(2-hydroxypropoxy)phenyl]propane, 1,1-bis(4-hydroxyphenyl)isobutane, 2,2-bis(4-hydroxy-tert-butylphenyl)propane, bis(2-hydroxynaphthyl)methane, 1,5-dihydroxynaphthalent, tris(4-hydroxyphenyl)methane, bis (4-hydroxyphenyl) ether, bis(4-hydroxyphenyl) sulfone, and the halogenation and hydrogenation products of the above-mentioned compounds. Bisphenol A is particularly preferred in this context.

Examples of suitable polyhydric alcohols which may be used in the invention include ethylene glycol, diethylene glycol, triethylene glycol, polyethylene glycols (n=1 to 35), 1,2-propylene glycol, polypropylene glycols (n=1 to 15), 1,3-propylene glycol, 1,4-butanediol, 1,5-pentanediol, 1,6- hexanediol, 1,2,6-hexanetriol, glycerol, neopentylglycol, 1,4-dimethylolcyclohexane, trimethylolethane, trimethylolpropane, and also block copolymers of ethylene oxide, propylene oxide, and ethoxylated and propoxylated bisphenols, for example propoxylated bisphenol A. Polyethylene glycols and polypropylene glycols (n=8 to 10) are particularly preferred in this context.

It also is possible to use polyglycidyl esters of polycarboxylic acids, which can be obtained by reacting epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized linolenic acid, or else with acidic polyesters. Examples are diglycidyl adipate, diglycidyl phthalate and diglycidyl hexahydrophthalate. A detailed listing of suitable epoxide compounds for use in the present invention can be found in the handbook "Epoxidverbindungen und Epoxidharze" [Epoxide compounds and epoxy resins] by A. M. Paquin, Springer Verlag, Berlin 1958, Chapter IV and in Lee, Neville, "Handbook of Epoxy Resins", McGraw-Hill Book Co., 1967, Chapter 2. The epoxide compounds mentioned may be employed individually or in a mixture.

Any aromatic polyol can be used as component (A-2). Suitable aromatic polyols useful as component (A-2) preferably include the aromatic, OH-containing compounds described above in connection with components (A-1)/(A-4-b), i e. polyhydric, preferably dihydric, phenols, their halogenation products and/or novolaks. Bisphenol A also is particularly preferred in this context.

The modiiying compounds (A-3) usually include compounds having at least two functional groups capable of reaction with the epoxide groups of component (A-1). These compounds typically are not classified under the aromatic polyols according to (A-2). They can be used, by targeted modification, in order to establish desirable properties of the base resin (A). In this context, the compounds involved may be polyamines (for example ethylenediamine, diethylenetriamine, triethylenetetramine, tetraethylenepentamine, etc.), polyoxyalkylene oxides having terminal amino groups (for example the Jeffamines® from TEXACO and Novamines®), polycarboxylic acids (for example maleic acid, phlmaric acid, phthalic acid, succinic acid, dimeric and trimeric fatty acids, etc., and their anhydrides, where available) and also aliphatic polyols (for example ethylene glycol, propylene glycol, butylene glycol, polyethylene glycol, polypropylene glycol, trimethylolpropane and trimethylolethane, neopentyl glycol, glycerol, etc.). Particular preference is given to dimeric fatty acids containing 20 to 50 carbon atoms and Jeffamines®.

The polyols useful as components (A-4-a) typically include polyols selected from the group consisting of polyacrylate-polyols, polyester-polyols, polyether-polyols, polycarbonate-polyols and polyurethane-polyols. Preferred polyols are those having weight-average molar masses ($M_w$, gel permeation chromatography; polystyrene standard) of between about 600 and about 12,000 g/mol, in particular from about 4000 to about 10,000 g/mol, and OH numbers which are expediently from about 6 to about 560 mg/g, preferably from about 9 to about 187 mg/g. Also preferred are purely aliphatic polyols. Particular preference is given to aliphatic polyether polyols having oxyalkylene units selected from oxyethylene and oxypropylene units and mixtures thereof, and polyester-polyols at least part of whose diol component comprises oligomeric or polymeric polyoxyalkylene glycols whose units are selected from oxyethylene and oxypropylene units.

Where the polyols do not contain hydrophilic polyoxyalkylene groups of this kind, they can obtain the requisite hydrophilicity by their content of from 10 to 5000 mmol/kg of finctional groups able to form ions in water. The ionic groups may be cationic or anionic in nature, with anionically modified polyols being preferred. Anionically modified polyester- or polyurethanepolyols can be prepared, for example, by replacing part of the low molar mass diol or polyol component with a diol or polyol component which contains acid groups, or with another component which contains acid groups and also at least one group which reacts with acid. Compounds particularly suitable for this purpose are hydroxycarboxylic acids, such as tartaric acid and dimethylolpropionic acid, and amino acids, such as taurine, lysine and ornithine, and hydroxyamino acids, such as serine. Anionic modified polyacrylate-polyols can be prepared, for example, by copolymerizing appropriately chosen quantities of alkyl (meth)acrylates with hydroxyalkyl (meth)acrylates and (meth)acrylic acid, with the quantity of hydroxyalkyl (meth)acrylate being chosen as a finction of the required hydroxyl number and the quantity of acid as a finction of the required content of ionic groups.

These polyols preferably possess only terminal, primary OH groups. Examples which may be mentioned here include block copolymers of ethylene oxide and propylene oxide and also polyethylene, polypropylene and polybutylene glycols, the use of mixtures of the respective polyalkylene glycols also being possible. Preference is given to the use of polyethylene glycols or products/mixtures with a high polyethylene oxide content.

In addition to the self-emulsifying epoxy resin (A) according to the invention, it is also possible to use further dispersants (B) of anionic, cationic and preferably nonionic type. Suitable compounds include alkylbenzenesulfonates, primary and secondary alkanesulfonates, α-olefinsulfonates, alkyl sulfates and alkyl ether sulfates as anionic surfactants and quaternary ammonium compounds as cationic surfactants, the ionic groups not being permitted to interact with the epoxide groups. Preference is given, however, to the use of nonionic surfactants, such as ethoxylated or eth/propoxylated alcohols, oxo alcohols, alkylphenols (e.g. Arcopal® from Hoechst), castor oils, esters, glycerol stearates, fatty acids, fatty amines, fatty alcohols, and also, for example, ethylene oxide-propylene oxide block copolymers (for example Pluronic® from BASF). Use can also be made of the emulsifiers described specifically for the dispersion of epoxy resin in, for example, U.S. Pat. Nos. 4,423,201 and 4,446,256 (products of polyalkylene glycols, diisocyanates and bisphenols), EP-A 0 497 404 (products of alkoxypolyalkylene glycols, anhydrides and alkylene oxides, epoxy alcohols or diglycidyl ethers), WO-A 91/10695 (products of polyglycidyl ethers, bifunctional compounds and alkoxypolyalkylene glycols), EP-A 0 109 173 (products of polyoxyalkylenepolyamines and epoxy resins) and DE-A 41 36 943 (products of polyalkylene glycols with diisocyanates and polyepoxides).

As component (C-1), any low molar mass, liquid epoxy-finctional compounds can be used. Usually, mono- and diglycidyl ethers which are known, inter alia, by the term reactive diluents can be used as component (C-1), examples being para-tert-butylphenyl glycidyl ether, n-butyl glycidyl ether, phenyl glycidyl ether, ortho-cresyl glycidyl ether, butanediol diglycidyl ether, hexanediol diglycidyl ether, neopentylglycol diglycidyl ether, dimethylolcyclohexane diglycidyl ether, 2-ethylhexyl glycidyl ether, and higher alkyl glycidyl ethers etc. (for example the reactive diluents of the series Grilonit® RV from Ems, Epodil® from Anchor or Eurepox® RV from Schering), versatic acid glycidyl ester (Cardura(® E 10 from Shell), liquid polyoxyalkylene glycol diglycidyl ethers (e.g. Beckopoxg EP 075 from Hoechst), the molar mass of which is preferably below 1000 g/mol, or else liquid epoxy resins, for example bisphenol A and F diglycidyl ethers. For simplicity, component (C-1) will be referred to below as "reactive diluent". Preferred reactive diluents include hexanediol diglycidyl ether and para-tert-butylphenyl glycidyl ether.

Suitable monomers useful as component (C-2) include any ethylenically unsaturated compounds which are capable of free-radical polymerization in aqueous emulsion and do not interact undesirably at room temperature with the epoxy resin dispersion present. These include acrylic, methacrylic and higher alkacrylic acids, and the alkyl esters thereof ($C_1$-to $C_{18}$-alkyl (meth)acrylates, for example, methyl acrylate and methyl methacrylate, ethyl acrylate and ethyl methacrylate, n- and isopropyl acrylate and methacrylate, n-, iso- and tertbutyl acrylate, n- and tert-butyl methacrylate, 2-ethylhexyl acrylate and methacrylate, 4-tert-butylcyclohexyl acrylate, isobornyl acrylate and methacrylate, etc.) and derivatives (for example acrylonitrile), and also vinyl derivatives (e.g. styrene, α-methylstyrene, vinyltoluenes, vinyl acetate, vinyl chloride, vinylidene chloride, N-vinylpyrrolidone etc.) and α,β-unsaturated carboxylic acids, such as maleic acid, fumaric acid, itaconic acid etc. and their derivatives, but also alkenes, such as isoprene and butadiene. The monomers also may contain finctional groups which participate in the curing reaction. Thus, monomers suitable in this respect are, for example, specifically glycidylfimctional monomers (e.g. glycidyl methacrylate, glycidyl acrylate). Finally, it also is possible for monomers which are polyfunctional, whether with respect to the polymerization or to the curing, to be present, for instance 1,6-hexanediol diacrylate and divinylbenzene.

Solvents (D) also can be added, if desired, to the dispersion. Particularly suitable solvents are organic solvents, such as glycols, mono- and di-ethers and -esters of glycols with alcohols and acids, aliphatic alcohols having linear or branched alkyl radicals of 1 to 12 carbon atoms, cycloaliphatic and araliphatic alcohols and also esters and ketones, it being possible to employ these solvents individually or in a mixture. Examples of suitable solvents include: ethylene glycol, ethylene glycol monomethyl ether, ethylene glycol dimethyl ether, butylglycol, methoxypropanol, ethoxypropanol, ethanol, 1- and 2-propanol, butanol, cyclohexanol, benzyl alcohol, ethyl acetate, acetone and methyl isobutyl ketone, although aromatic compounds such as toluene or xylene also can be used. Preferred solvents include butylglycol, methoxypropanol, methoxybutanol, isopropoxypropanol, ethoxypropanol, dipropylene glycol dimethyl ether, 2-propanol and benzyl alcohol.

As hardeners (II) for the epoxy resin dispersions (I) of the invention, it is possible to employ any curing agents or hardening compounds (epoxy hardeners) known for this purpose, such as basic curing agents (amine hardeners), for example polyamines, Mannich bases, and adducts of amines with polymers, such as polyepoxides and polyamidoamines. Curing of the epoxy resin dispersions (I) according to the invention is also possible by the use of latent curing agents, i.e. compounds which display their crosslinidng action with respect to epoxide compounds only at a relatively high temperature, for example from 60 to 250° C. Examples of such hardeners are urea, dicyandiamide, imidazole, guanidine, hydrazide and derivatives of these compounds. But melamine resins, for example, or acidic curing agents also are useful in the invention. Among these latent curing agents, dicyandiamide is preferably employed.

Examples of useful basic curing agents, preferably for the preferred curing at room temperature and/or at lower temperatures (amine cold hardeners), which are generally employed in a ratio of epoxide equivalents to amine hydrogen equivalents of from 1: (0.75 to 2.0), are polyalkylenepolyamines, such as diethylenetriarnine, triethylenetetramine, tetraethylenepentamine, pentaethylenehexamine and so on, and also 2,2,4-and/or 2,4,4-trimethylhexamethylenediamine, bis(3-aminopropyl)amine, 1,4-bis(3-aminopropyl)piperazine, N,N-bis(3-aminopropyl) ethylenediamine, neopentanediamine, 2-methyl-1,5-pentanediamine, 1,3-diaminopentane, hexamethylenediamine, etc., and also cycloaliphatic amines, such as 1,2- or 1,3-diaminocyclohexane, 1,4-diamino-3,6-diethylcyclohexane, 1,2-diamino-4-ethylcyclohexane, 1-cyclohexyl-3,4-diaminocyclohexane, isophoronediamine and reaction products thereof, 4,4'-diaminodicyclohexylmethane and-propane, 2,2-bis(4-aminocyclohexyl)-methane and -propane, 3,3'-dimethyl-4, 4'-diaminodicyclohexylmethane, 3-amino-1-cyclohexylaminopropane, and 1,3- and 1,4-bis (aminomethyl)cyclohexane. Of the araliphatic amines, use is made in particular of those in which aliphatic amino groups are present, examples including meta- and para-xylylenediamine and/or their hydrogenation products. The amines mentioned can be used alone or as mixtures.

Suitable Mannich bases can be prepared by condensation of polyamines, preferably diethylenetriamine, triethylenetetramine, isophoronediamine, 2,2,4- or 2,4,4-trimethylhexamethylenediamine, 1,3- and 1,4-bis (aminomethyl)cyclohexane, especially meta- and para-xylylenediamine, with aldehydes, preferably formaldehyde, and mono- or polyhydric phenols having at least one ring position which is reactive to aldehydes, preferably formaldehyde, and mono- or polyhydric phenols having at least one ring position which is reactive toward aldehydes, examples being the various cresols and xylenols, para-tert-butylphenol, resorcinol, 4,4'-dihydroxydiphenylmethane, 2,2-bis(4-hydroxyphenyl)propane, are preferably phenol. Examples of suitable amine-epoxide adducts include reaction products of polyamines, for example ethylenediamine, propylenediamine, hexamethylenediamine, 2,2,4-,2,4,4-trimethylhexamethylenediamine, metaxylylenediamine and/ or bis(aminomethyl)cyclohexane, with terminal mono- or polyepoxides, for example propylene oxide, hexene oxide, cyclohexene oxide, or with glycidyl ethers, such as phenyl glycidyl ether, tert-butylglycidyl ether, ethylhexyl glycidyl ether, butyl glycidyl ether, or with glycidyl esters, such as the glycidyl ester of Versatic acid marketed by Shell, Cardura® E 10, or the polyglycidyl ethers and esters mentioned under (A-1).

Polyamidoamines which can be used to cure the epoxy resin dispersions according to the invention can be obtained, for example, by reacting polyamines with mono- or polycarboxylic acids, for example dimerized fatty acids. In addition to the abovementioned polyamines, preference as amine hardeners can be given to the use of water-soluble polyoxyalkylenedi- and -polyamines having number-average molar masses of from 100 to 2000 g/mol, for example the products marketed by Texaco under the trade name Jeffamines®, and the readily water-dispersible curing agents as described in DE-B 23 32 177 and EP-B 0 000 605, ie. modified amine adducts, for example.

In order to achieve more rapid and/or more complete curing, it also is possible to subject the coatings which are obtainable from the epoxy resin dispersions of the invention with the amine hardeners mentioned to heating at from 50 to 120° C. for from 15 to 120 minutes (so-called forced drying). Suitable curing agents for heat curing include water-soluble or water-miscible polycarboxylic acids. Examples of such polycarboxylic acids are cyclopentanetetracarboxylic acid, cyclobutanetetracarboxylic acid, 1,2,3,4-tetrabutanecarboxylic acid, tartaric acid, malonic acid, malic acid, citric acid, aconitic acid, etc.

Also suitable for use as curing agents includes anhydrides or acidic esters of these acids with polyhydric alcohols having 2 to 12, preferably 2 to 6, carbon atoms, such as, for example, neopentylglycol, glycerol, trimethylolethane or trimethylolpropane, the alkanediols and oligomers thereof, which may contain one or more ether bridges, such as ethylene glycol, propane- and butanediols, the esters always having at least two free carboxyl groups. As polycarboxylic acid hardeners it also is possible to employ acidic esters having two or more carboxyl groups of carboxylic acids such as, for example, pyromellitic, trimellitic acid, phthalic acid, endomethylenetetra- or -hexahydrophthalic acid, maleic acid, fumaric acid and their anhydrides, where they exist, with polyhydric alcohols, for example, those mentioned above, provided these acidic esters possess sufficient solubility in or dilutability in water. It is likewise possible to use suitable acidic hydrophilic polyesters, for example, of the polybasic acids with the polyhydric alcohols mentioned. Furthermore, reaction products of these acid anhydrides or acids with polyamino functional compounds, for example polyamines such as diethylenediamine, diethylenetriamine, triethylenetetramine and higher homologs, or with the wide variety of polyoxyalkylenediamines (Jeffamines® from Texaco), and hydroxycarboxylic acids modified on the hydroxyl groups, for example alkoxylated citric acid or tartaric acid, etc., and also all acids which are capable of transesterification under curing conditions, for example the methyl esters of trimellific acid or malic acid, can be employed as curing agents. Likewise suitable are acidic salts of the acids mentioned, preferably those with volatile bases, and also further derivatives which liberate reactive carboxyl groups under curing conditions. As acidic curing agents, preference is given to the use of polycarboxylic acids.

The epoxy resin dispersions can be cured with the acidic curing agents expediently at relatively high temperatures, for example at from 60 to 250° C., preferably from 80 to 200° C., in from one to 150 minutes. In order to achieve complete through-curing, and/or to reduce the temperatures necessary for sufficient through-curing, the acidic hardeners mentioned can be admixed with small quantities of compounds which catalyze the carboxyl/epoxide group reaction. Suitable compounds include strong protonic acids, such as phosphoric acid or para-toluenesulfonic acid, tertiary amines, such as triethylamine and N,N-dimethylbenzylamine, nitrogen heterocycles, such as imidazole, pyridine and their derivatives, trialkyl- and triarylphosphines, and also appropriate phosphonium compounds and metal salts or metal chelates, for example tin(II) octoate.

In addition to the above-described hardeners, it also is possible to use amine and/or phenolic resins for curing, which are employed in proportions by mass of from 5 to 50%, preferably from 10 to 35%, based on the overall solids content of the finished dispersion. In this case, if desired, the dispersion is additionally adjusted, by means of extra water, to an overall solids content of from 10 to 80%. Examples of suitable amine resins are amine aldehyde resins, ie. condensation products of aldehydes with melamine (melamine resins), urea (urea resins), acetoguanamine (acetoguanamine resins) or similar compounds and corresponding precondensation products. Preferred aldehyde condensation products of melamine are the melamine methoxy-alkyl ethers, in which the alkyl radicals are methyl, n-butyl or isobutyl groups, preferably methyl groups, such as hexamethoxymethylmelamine, ethoxymethoxymethylmelamine, monomethylolpentamethoxymethylmelamine, dimethyloltetramethoxymethylmelamine, trimethyloltrimethoxymethylmelamine and the like having a substantially monomeric structure, and corresponding oligomeric or polymeric products.

Phenolic resin hardeners which may be used include resols, formaldehyde-phenolcarboxylic acid resins and phenolic resin precursors, with preference being given to the commercial, etherified, water-dilutable phenolic resin resols. If desired, acidic catalysts, such as para-toluenesulfonic acid, cyclohexanesulfamic acid, acidic butyl phosphate and phosphoric acid, either as they are or as (amine) salts, can be added to the dispersions containing phenolic resin and/or amine resin, in order to accelerate the curing reaction, so as to provide films or coatings which cure at relatively low temperature or in a relatively short time.

As customary additives useful as component (III), which may be present in the binders or dispersions according to the invention, mention may be made here, for example, of the customary paint additives such as pigments, pigment pastes, antioxidants, leveling agents and thickeners, antifoams/deaerating agents and/or wetting agents, reactive diluents, fillers, catalysts, preservatives and protective colloids. These additives, like the hardeners, can if desired not be added to the system until directly before processing.

The emulsifying component (A-4) preferably is prepared by condensation of the specified polyols (A-4-a) with the polyglycidyl ethers (A-4-b) in the presence of suitable catalysts at from 50 to 200° C., preferably from 90 to 170° C., the ratio of equivalents of OH groups to the EP groups being from 1:2 to 1:10, preferably from 1:4 to 1:8, and the epoxide group content (epoxide equivalent weight) of these condensation products being between 125 and 6700 mmol/kg (150 g/mol and 8000 g/mol), preferably between 1000 and 4000 mmol/kg (250 g/mol and 1000 g/mol).

Suitable catalysts for the preparation of (A-4) include strong inorganic and organic bases, for example sodium hydroxide, potassium hydroxide, lithium hydroxide, barium hydroxide, strontium hydroxide, alkali metal alcoholates such as sodium methylate, lithium methylate, sodium ethylate and potassium dodecylate, and the alkali metal salts of carboxylic acids, for example sodium stearate and lithium stearate. Also suitable are strong inorganic and organic protonic acids, for example phosphoric acid, tetrafluoroboric acid and benzenesulfonic acid. Lewis acids also can be used as catalysts. Examples include tin(IV) chloride, titanium(IV) chloride, titanium(IV) isopropylate, triethyloxonium tetrafluoroborate, and also boron trifluoride and its complexes, for example with phosphoric acid, acetic acid (1:1 and 1:2), methanol, diethyl ether, tetrahydrofuran, phenol, ethylene glycol monoethyl ether, polyethylene glycol (MW 200), dimethyl sulfoxide, di-n-butyl ether, di-n-hexyl ether, succinic acid and aliphatic, cycloaliphatic and araliphatic amines, and also nitrogen heterocycles.

As catalysts, it is preferred to employ $BF_3$-diethyl ether, $BF_3$-amine complexes and aqueous tetrafluoroboric acid. The proportion by mass of catalyst is in general from 0.1 to 5%, preferably from 0.1 to 1%, based on the reaction mixture. To facilitate its addition, the catalyst may be diluted in a solvent such as diethyl ether, a glycol ether or cyclic ether, ketones and the like.

In order to prepare (A-4), the mixtures to be reacted, comprising compounds containing hydroxyl groups and those containing epoxide groups, usually are heated to the temperature at which the condensation takes place at a sufficient rate, i.e. in from 30 minutes to 5 hours. The reaction is advantageously monitored by way of the increase in the epoxide equivalent, which indicates a reduction in the content of epoxide groups. The reaction can be terminated by cooling to below the reaction temperature.

In order to prepare the dispersions according to the invention, the epoxy resin (A) can first be prepared by condensation of components (A-1) and (A-2) and, if desired, (A-3) with (A4) at elevated temperatures, in general from 100 to 220° C., preferably from 150 to 180° C., in the presence of a catalyst which accelerates the condensation. Examples of suitable condensation catalysts which can accelerate the reaction include phosphines, such as triphenylphosphine, phosphonium salts, for example benzyltrimethylphosphonium chloride, tertiary amines, such as N,N-dimethylbenzylamine, quaternary ammonium salts, for example tetramethylammonium chloride, alkali metal hydroxides, such as sodium hydroxide and lithium hydroxide, alkali metal carbonates, such as sodium carbonate and lithium carbonate, alkali metal salts of organic acids, for example sodium formate, lithium benzoate and lithium stearate, Lewis bases and Lewis acids, for example boron trifluoride and its complexes, titanium tetrachloride, tin chloride and triethyloxonium tetrafluoroborate.

The entire quantity of the optional diluent (C) can be added at once prior to dispersing, thus acting as a viscosity reducer and facilitating dispersion, or, in the case of a relatively large quantity, it can be present in part during the dispersion operation, with the remainder being added after dispersion, for example continuously during the emulsion polymerization of component (C-2). In this case, it is not necessary for the two portions to be identical in respect of the nature and composition of components (C-1) and (C-2). In this way it is possible, for example, in the case of epoxidepolyacrylate dispersions, to produce core-shell particles in a targeted manner. The presence of the diluent during dispersion has the advantage that the viscosity maximnum in the course of phase inversion W/O→O/W need not be reduced by inert solvents which remain in the finished dispersion, as was described in DE-A 41 28 487. Thus, it is possible to formulate completely solvent-free dispersions—a further considerable improvement on the prior art. However, an excessive content during the dispersion operation would reduce the viscosity too much, and the shear force to be applied for the processes of dispersing would no longer be able to be developed. For this reason it is necessary, if appropriate, to divide the total quantity into two appropriate portions. The diluent has at least one of the components, reactive diluent (C-1), and monomer (mixture) (C-2). While the reactive diluent remains unchanged in the finished dispersion (and is not incorporated until the curing process), the monomer component is polymerized after dispersion in water and in this way already makes a contribution to the solids content of the dispersion.

The proportion by mass of epoxy resin (A) to addition polymers formed from the monomers (C-2) usually is from 100:1 to 20:80, preferably between 100:10 and 50:50. In this context, if desired, the polymer formed from the monomers (C-2) comprises glycidyl-containing monomers, preferably in a proportion by mass of from 2.5 to 25%. The proportion by mass of reactive diluent (C-1) may be up to 25%, based on the sum of the masses of polymers (A) and (C-2). The proportion by mass of optional dispersant (B) is based on all of the water-insoluble constituents of the dispersion, i.e. on epoxy resin (A), polymer (C-2) and reactive diluent (C-1), and is between 0 and 25%, preferably between 0 and 10%, but with particular preference is 0%. The solids content by mass of the dispersion according to the invention is between 30 and 90%, preferably from 55 to 75%, it being possible for the dispersion to contain up to 10% of solvent.

In order to prepare, for example, the epoxide-polyacrylate dispersion at temperatures of from 60 to 200° C., preferably from 70 to 1200° C., the monomers (C-2), stabilized if appropriate with suitable inhibitors known to the person skilled in the art, and, if desired, reactive diluents (C-1) or an appropriate portion thereof are added to the epoxy resin (A). Then, if desired, dispersant (B) can be added, followed if desired by organic solvent (D), and the mixture then is stirred for from 15 to 180 minutes, preferably from 30 to 90 minutes. An option, following the addition of the monomers (C-2), is to carry out a reaction between the epoxy resin and the monomers, for example, the addition reaction of carboxyl- or amino-finctional monomers with the epoxide groups, or grafting onto aliphatic carbon atoms of the epoxide components (A) and (C-2), before the dispersant is added.

Then, with vigorous stirring at temperatures of from 30 to 100° C., preferably from 50 to 90° C., the appropriate quantity of water (E) can be metered in in at least two portions, preferably in a plurality of portions, to produce the aqueous dispersion. This method of addition of water consists of dividing the total quantity of water into at least two portions, which may be of equal amount, and adding these portions one after the other with a delay between the individual additions. During this addition, it is possible, if desired, to add suitable antifoams/deaerating additives. Dispersion takes place expediently with the aid of a suitable dispersing apparatus, for example, a high-speed paddle stirrer, a multipulse coil stirrer, a colloid mill, a homogenizer, a dissolver or any other rapid mixer with a high shear force. This operation is described in great detail in DE-A 41 28 487.

In the case, for example, of epoxy-acrylate dispersions, emulsion polymerization then can be initiated at an appropriate temperature in the resulting epoxy resin dispersion, which contains (acrylate) monomers and, if desired, reactive diluents. The temperature should be sufficiently high for a rapid rate of polymerization to be reached, although not so high as to threaten the stability of the dispersion. In the case of redox initiators, the oxidizing agent preferably is incorporated homogeneously with the water of dilution and the reducing agent is metered in continuously. However, all conceivable variants of addition of these components likewise are in accordance with the invention. When the quantity of monomer is higher than that required for the dispersion, then the remaining quantity of the monomers (C-2) also is metered in, it being possible here to prepare core-shell acrylate particles in a targeted manner in order to control the properties of the dispersion as desired. The preferred temperature range for the emulsion polymerization is from about 60 to about 90° C., with the reaction being monitored by determining the solids content or by means of gas chromatography. An unwanted increase in viscosity can be compensated by further addition of water.

Suitable initiators for the emulsion polymerization are any initiators capable of initiating the polymerization, including those of the thermal type or those used in redox systems, all of which are well known to the person skilled in the art. Thermal initiators include peroxides, hydroperoxides, per esters, diazo compounds, for example dibenzoyl peroxide, acetyl peroxide, benzoyl hydroperoxide, tert-butyl hydroperoxide, di-tert-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl tert-butyl peroxide, butyl tert-butyl peroxide, dilauroyl peroxide, difuroyl peroxide, ditriphenylmethyl peroxide, bis(p-methoxybenzoyl) peroxide, p-monomethoxybenzoyl peroxide, rubrene peroxide, ascaridol peroxide, tert-butyl peroxybenzoate, diethyl peroxyterephthalate, propyl hydroperoxide, isopropyl hydroperoxide, n-butyl hydroperoxide, tert-butyl hydroperoxide, cyclohexyl hydroperoxide, trans-decalin hydroperoxide, α-methylbenzyl hydroperoxide, α-methyl-α-ethylbenzyl hydroperoxide, tetralin hydroperoxide, triphenylmethyl hydroperoxide, diphenylmethyl hydroperoxide, 2,5-dimethyl-2,5-bis-(2-ethylhexanoylperoxy)hexane, 1,1-bis(tert-butylperoxy)cyclohexane and tert-butyl perbenzoate. Redox systems can be selected from oxidants, for example hydrogen peroxide, teit-butyl hydroperoxide and persulfates, in combination with reducing agents, such as alpha-hydroxy ketones, ascorbic acid, hydrazine and sulfites, bisulfites, metasulfites or hydrosulfites. Preferably, initiators should be used which generate few or no ionic compounds in order not to increase unnecessarily the sensitivity of the subsequently baked films to water. A particularly preferred system is tert-butyl hydroperoxide/ascorbic acid.

EP-A 0 051 483 describes and claims epoxy resin dispersions of self-emulsifying epoxy resins which contain polyalkylene glycol glycidyl ethers in addition to polyepoxides and aromatic polyols. Since aliphatically attached glycidyl ether groups are in principle less reactive than their aromatically attached counterparts, it can be assumed that not all of the polyalkylene glycol glycidyl ether groups are incorporated into the resin and therefore that some exist in free form. The import of this for the curing of the dispersions is a reduction in reactivity and decreased crossliniking, in combination with poorer water resistance. These results are in fact found in practice. In order to remedy this disadvantage, it would be necessary during the resin synthesis, first to react the entire polyphenol with the polyalkylene glycol glycidyl ether and then to react the remaining phenolic prepolymer with further polyepoxide, to form the base resin.

Although the dispersions (I) according to the invention are indeed built up in accordance with a similar principle, the epoxide groups of the emulsifying compound (A-4) have a reactivity which is comparable with that of the polyepoxides (A-1) or (A-4-b). As a result, the emulsifier is incorporated into the resin to a greater extent, and terminal epoxide groups of component (A-4) which remain in the resin exert no adverse effect on the curing reaction. A two-stage resin synthesis, as proposed above, is not necessary here. Moreover, the emulsifier (A-4) can be synthesized by a known method from inexpensive raw materials, while the synthesis of polyalkylene glycol glycidyl ethers is extremely complex (separation of alkali metal chlorides from the water-soluble product after the reaction of polyalkylene glycols with epichlorohydrin). In the ideal case, the production of the epoxy resin dispersion, starting from the synthesis of the emulsifier (A-4) and extending to the dispersion stage, and, if desired, subsequent emulsion polymerization, can be carried out in one and the same reactor.

In comparison with the self-emulsifying epoxy resins described in Patent EP-A 0 272 595, the emulsifier in the dispersion of this invention can be incorporated to a greater extent, which is reflected, for example, in the much improved water resistance and lower shear sensitivity of the epoxy resin dispersion (I). The inventive dispersions can be pigmented and can also be sprayed, in both cases in a much better manner.

The process according to the invention also can be used to obtain base resins which, in contrast to the flexibilized, externally emulsified epoxy resins described in the Application DE-A 41 28 487, require no flexibilization by modifiying compounds (A-3), since the incorporated emulsifier (A-4) already shows an additional flexibilizing action. The dispersions (I) according to the invention nevertheless prove to be outstanding in their suitability for aqueous anticorrosion coatings.

A disadvantage in relation to externally emulsified systems can be seen in the fact that resins which have a self-emulsifying action as a result of nonionic structures in the polymer main chain give rise, in principle, to dispersions having a less favorable relationship of viscosity to solids content for a given particle size. What this means is that, in general, lower solids contents are achieved. By a skilful choice of the parameters in connection with the synthesis of the emulsifier (A-4), namely the molar mass of the polyoxyalkylene glycol used, the OH:EP ratio and controlled deviation of the final content of epoxide groups from the theoretical value, however, it is possible to produce dispersions which in their characteristics are comparable with those of the systems of Patent EP-B 0 272 595 and of Application DE-A 41 28 487. Those skilled in the art are capable of choosing the appropriate parameters using the guidelines provided herein.

The advantages of the so-called monomer process using appropriate monomers (C-2) during the dispersion have been described at length in Application DE-A 43 27 493 the disclosure of which is incorporated herein by reference in its entirety. It should be stressed yet again here that it is possible by means of this process to carry out successful dispersion even of resins of relatively high viscosity, i. e. with higher molar mass and/or with incorporated emulsifiers. It is possible, moreover, to obtain solvent-free dispersions for the stoving sector, in particular, which offer technological advantages over solvent-containing dispersions.

In the case of systems which cure at room temperature, it is important that the minimum film-forming temperature remains below the substrate temperature for as long as possible so that coalescence of the dispersion particles, and therefore film formation, take place. For this reason, dispersions with notable solvent contents are found in this sector in particular. In this case it is not possible simply to replace the solvent, which of course is intended to act as a coalescence agent, by monomers (C-2), since the latter are ultimately polymerized and therefore in turn form resin particles. Because of this, the use of epoxy-functional reactive diluents (C-1) is desired since the latter act as coalescence agents during film formation and are subsequently incorporated into the film on curing. In this context, it should be noted, however, that care should be exercised from an occupational-health point of view when selecting the reactive diluents.

By combination of both methods it is possible to produce customized epoxy resin dispersions, the use of reactive diluents (C-1) making sense only in the case of room temperature-curing systems and the monomer process for these systems promising success in conjunction with reactive diluents (C-1) and/or solvents. In principle, however, the use of the diluents described is not restricted in the context of this invention.

On the basis of their outstanding technical properties which have already been discussed, for example, in respect of adhesion, very high hardness, corrosion prevention, and resistance to water and chemicals, inter alia, the dispersions according to the invention are suitable, in combination with appropriate curing agents and additives, for the production of coatings, intermediate coats, coating materials, molding compositions and curable compositions for a very wide range of applications. For example, they can be used to produce protective and/or decorative coatings on a great variety of substrates, especially on rough and porous substrates, for example wood, mineral substrates (e.g. concrete and masonry), glass, plastics (e.g. polyethylene, polypropylene, etc.), composite materials, ceramics and pretreated or nonpretreated metals.

The dispersions according to the invention also are outstandingly suitable for one-layer coating. The adhering coat can remain unchanged as it is, or else it can be used as an intermediate coat, i.e. as a substrate for furthter coats, which may in turn consist of the same coating material or of a different, conventional coating material. Given a suitable choice of monomers (C-2) and, if desired, of reactive diluents (C-1) and/or solvents (D) it is possible to prepare, from epoxide-polyacrylate dispersions, matt clearcoats whose profile of properties is otherwise of continued high quality (good adhesion to a wide variety of substrates, very high hardness, good resistance properties, etc.). Because of their ready dilutability and their favorable properties, the dispersions according to the invention also are suitable for additional use in electrodeposition coating.

A further possible application of the dispersions according to the invention is their use for the production of water-dilutable adhesives. They also can be employed as binders for textile, organic and/or inorganic materials. In addition, they may serve as an additive to polymer cements. When used as coating composition or as predominantly aqueous coating material, application to the substrate can be by conventional methods such as, for example, by brushing, spraying, dipping or rolling. Where no curing agents (II) are used for cold curing, the coatings can be cured by heating at from 80 to 250° C. for a time which is sufficient to effect complete curing, in general from 5 to 60 minutes.

Any additives which may be required in accordance with component (III) and, if desired for the intended application, further curing agents as component (II) are added in quantities such as required for the particular application and known to the person skilled in the art. In this case, the choice of solids content and solvent content is left to the user.

The present invention now will be described with reference to the non-limiting examples which follow. All contents, percentage contents and proportions are by mass, unless specified otherwise.

EXAMPLES

1. Preparation of the Emulsifiers (A-4)

1.1 General procedure

Polyethylene glycols having various molar masses $M_W$ were homogenized at 125° C. with Beckopox® EP 140 (bisphenol A diglycidyl ether, epoxide group content 5400 mmol/kg (EEW 185 g/mol)), 0.2% of Anchor® 1040 ($BF_3$-amine complex, Air Products) was added, and the mixture was held with the temperature steadily rising until the desired content of epoxide groups, E, had been reached. The reaction was terminated by rapid cooling to below 100° C.

1.2 Examples of emulsifiers (A-4)

Emulsifiers according to the following Table were prepared:

| (A-4) Number | $M_w$ (PEG) g/mol | n(EP):n(OH) | E theor. mmol/kg | EEW theor. g/mol | E at turn. mmol/kg | EEW at turn. g/mol | Final temp. °C. | Duration h |
|---|---|---|---|---|---|---|---|---|
| 1 | 6000 | 3.0 | 562 | 1778 | 521 | 1920 | 155 | 4 |
| 2 | 6000 | 4.3 | 870 | 1150 | 669 | 1495 | 150 | 2.5 |
| 3 | 6000 | 5.5 | 1120 | 893 | 1105 | 905 | 145 | 2 |
| 4 | 8000 | 3.0 | 439 | 2278 | 361 | 2770 | 155 | 4 |
| 5 | 8000 | 4.3 | 688 | 1453 | 625 | 1600 | 140 | 4 |
| 6 | 8000 | 4.3 | 688 | 1453 | 435 | 2300 | 150 | 3 |
| 7 | 8000 | 5.5 | 897 | 1115 | 769 | 1300 | 150 | 5 |
| 8 | 10,000 | 4.3 | 564 | 1756 | 490 | 2040 | 160 | 4 | n(OH): Quantity of hydroxyl groups
n(EP): Quantity of epoxide groups

Formula for theoretical epoxide group content:

$$E = \frac{2 \times [n(\text{EP})/n(\text{OH}) - 1]}{M_w(\text{PEG}) + 2 \times [n(\text{EP})/n(\text{OH})] \times 185 \, \text{g/mol}}$$

$M_w$ (PEG): Weight-average molar mass of the polyethylene glycol

2. Self-Emulsifying Base Resins (A) of Type 1, 12% Emulsifier 2.1 General procedure The corresponding compound (A-4, 58 g) were initially introduced together with 98 g of bisphenol A and 325 g of Beckopox® EP 140. The mixture was heated to 125° C. and the reaction was initiated by adding 0.4 g of Shell Catalyst® 1201. Through exothermicity, the temperature rose to about 160° C. This temperature was maintained until the final content of epoxide groups had been reached.

2.2 Examples of self-emulsifying base resins (A) of type 1
Base resins according to the following table were prepared:

| (A) Number | Emulsifier (A-4) | E mmol/kg | EEW g/mol |
|---|---|---|---|
| 1 | 1 | 1898 | 527 |
| 2 | 2 | 1942 | 515 |
| 3 | 3 | 1965 | 509 |
| 4 | 4 | 1894 | 528 |
| 5 | 5 | 1953 | 512 |
| 6 | 6 | 1905 | 525 |
| 7 | 7 | 1980 | 505 |
| 8 | 8 | 1898 | 527 |

3. Dispersions (I) of Type 1 for Cold-Curing Coatings

The dispersions of this series were included to demonstrate their technical superiority over systems according to Patent EP 272 595. For this reason, these dispersions were produced without reactive diluents (C) but with solvent (D).

The comparison example was the dispersion Beckopox® EP 384w (Hoechst AG), which contained 3% benzyl alcohol (BZA) and 7% methoxypropanol (MOP) as solvent (D).

3.1 General procedure

The base resin was homogenized at 100° C. with 20% by weight of a mixture of 3 parts of BZA and 7 parts of MOP and then dispersed by slow, portionwise addition of water accompanied by thorough stirring. The dispersion method was based on the description in the Application DE-A 41 2-8 487.

3.2 Examples of dispersions (I) of type 1 for cold-curing coatings Dispersions according to the following Table were prepared with MOP as solvent:

Details of Test Conditions

1. Dust-dry: glass beads scattered on the film can no longer be removed with a brush after curing.
2. Tack-free: the glass beads can be removed with a brush after curing.
3. Pot life: after mixing hardener and dispersion, films with a wet thickness of 200 μm are drawn out every half an hour. The appearance of turbidity in the film after curing indicated the end of the processing time (pot life) and was entered as the test result.
4. Hardness: König pendulum hardness, DIN 53 157.
5. Water resistance after 24 h, storage at room temperature: films drawn out with a wet thickness of 200 μm on glass

| (I) Number | Base resin (A) | Solids content by mass % | Viscosity mPa · s | Particle size nm | E mmol/kg | EEW g/mol | Solvent content by mass % |
|---|---|---|---|---|---|---|---|
| 1 | 1 | 49.4 | 1920 | 507 | 921 | 1086 | 6.9 |
| 2 | 2 | 43.0 | 24,000 | 465 | 823 | 1215 | 6.0 |
| 3 | 3 | 51.5 | 1290 | 603 | 997 | 1003 | 7.2 |
| 4 | 4 | 40.8 | 680 | 592 | 754 | 1326 | 5.7 |
| 5 | 5 | 47.7 | 3500 | 503 | 909 | 1100 | 6.7 |
| 6 | 6 | 38.7 | 13,600 | 300 | 719 | 1390 | 5.4 |
| 7 | 7 | 47.4 | 4600 | 625 | 912 | 1097 | 6.6 |
| 8 | 8 | 42.9 | 4100 | 705 | 806 | 1240 | 6.0 |
| Comparison | EP 384w | 52 | 1000 | 500 | 600 | 1000 | 7.0 |

4. Performance Testing of the Dispersions Obtained Under 3.1

4.1 Clearcoat testing

Testing was carried out against the comparison EP 384w using the hardener Beckopox® VEH 2133w (Hoechst AG) diluted to 40%. 100 g of the dispersion were employed in each case. Curing took place at 21° C. and 34% relative atmospheric humidity. The test results are summarized in the Table below:

plates were tested after storage for 24 h in water at room temperature.

4.2 Testing as anticorrosion coating with pigmentation of the dispersion

The abovementioned systems were subjected to initial screening with a preliminary anticorrosion formulation, not yet optimized for the pigmentation of solid-resin dispersions, in accordance with the following Table, using 100 g of dispersion in each case:

| System | Units | 1 | 2 | 3 | 4 | 5 | 6 | 7 | 8 | Comparison |
|---|---|---|---|---|---|---|---|---|---|---|
| Curing agent | g | 26.7 | 23.9 | 28.9 | 21.9 | 26.4 | 20.9 | 26.4 | 23.4 | 29.0 |
| Processing time | h:min | 1.00 | 0.30 | 1.00 | 1.00 | 0.45 | 1.00 | 0.45 | 0.45 | 0.45 |
| Pot life indication | h:min | — | 2.00 | — | — | — | 1.00 | 2.00 | — | — |
| Drying dust-dry | h:min | 0.30 | 0.30 | 0.30 | 0.30 | 0.30 | 0.30 | 0.30 | 0.30 | 0.30 |
| Drying tack-free | h:min | 5.00 | 7.30 | 5.00 | 5.30 | 5.30 | 5.30 | 5.30 | 5.30 | 5.00 |
| Leveling | 1) | 0 | 0 | 0 | 0 | 0 | 0 | 0 | 0 | 0 |
| Film turbidity | 1) | 0 | 0 | 0–1 | 0 | | | | | |
| Surface tab | 1) | 0 | 0 | | | | | | | |
| Pendulum hardness 1 day | s | 98 | 118 | | | | | | | |
| Pendulum hardness 2 days | s | 112 | 132 | | | | | | | |
| Pendulum hardness 7 days | s | 157 | 177 | | | | | | | |
| Water resistance after 2 days | 1) | 2 | 0–1 | | | | | | | |
| Pendulum hardness after WRT | s | 111 | 110 | | | | | | | |
| Pendulum hardness in the VS | s | 118 | 135 | | | | | | | |

1) The rating scale is from 0 = very good to 5 = poor.
WRT: Water resistance test
Pendulum hardness after WRT: The pendulum hardness was determined on the immersed part of the specimen, after it had been dried for 1 day
Pendulum hardness in the VS: The pendulum hardness was determined on that part of the specimen which had been in the vapor space above the immersed part during the water resistance test, after drying for 1 day

| System | | 1 | 3 | 4 | 5 | 6 | 7 | 8 | Comparison |
|---|---|---|---|---|---|---|---|---|---|
| Deionized water | g | 0.0 | 0.0 | 0.0 | 6.7 | 6.7 | 3.3 | 3.3 | 10 |
| Additol XL 270 | g | 0.9 | 1.0 | 0.8 | 0.9 | 0.7 | 0.9 | 0.8 | 1 |
| Talc iT-extra | g | 11.8 | 12.1 | 9.5 | 11.2 | 9.0 | 11.1 | 10.0 | 12.5 |
| ZPA | g | 13.9 | 14.6 | 11.4 | 13.0 | 10.9 | 13.4 | 12.1 | 15 |
| EWO | g | 9.2 | 9.7 | 7.6 | 9.0 | 7.2 | 9.0 | 8.0 | 10 |
| Oxide red 130 M | g | 11.8 | 12.1 | 9.5 | 11.2 | 9.0 | 11.1 | 10.0 | 12.5 |
| Deuteron 0.1% | g | 9.2 | 9.7 | 7.6 | 9.0 | 7.2 | 9.0 | 8.0 | 10 |
| Total | g | 156.4 | 159.2 | 146.4 | 161.0 | 150.7 | 157.8 | 152.2 | 171 |
| Beckopox VEH 2133w 80% strength | g | 13.4 | 14.4 | 10.9 | 13.2 | 10.4 | 13.2 | 11.7 | 15 |
| Deionized water | g | 40 | 40 | 50 | 30 | 50 | 47 | 50 | 30 |
| DIN cup | sec | 30 | 25 | 35 | 35 | 35 | 35 | 25 | 30 |
| Stability resin | | OK | Precipitates | OK | OK | OK | OK | OK | OK |
| Gloss 60° | % | 18.3 | 23.1 | 8.9 | 18.7 | 12.6 | 9.0 | 13.0 | 8.7 |
| Adhesion | 1) | 5 | 5 | 5 | 5 | 5 | 5 | 5 | 5 |
| Erichsen indentation after 4 weeks | mm | 1.7 | 1.0 | 1.5 | 1.5 | 1.1 | 1.2 | 1.3 | 0.7 |
| Tropical-climate test after 1 day | m | 5 | 4 | 3 | 5 | 0 | 2–3 | 0 | 5 |
| | g | 1–2 | 1 | 0–1 | 1 | 0 | 1 | 0 | 2 |
| Tropical-climate test after 3 days | m | — | 5 | 5 | — | 5 | 5 | 0 | — |
| | g | | 1 | 0–1 | | 0–1 | 0–1 | 0 | |
| Tropical-climate test after 1 week | m | — | — | — | — | — | — | 0 | — |
| | g | | | | | | | 0 | |
| Tropical-climate test after 2 weeks | m | — | — | — | — | — | — | 0 | — |
| | g | | | | | | | 0 | |
| Tropical-climate test after 3 weeks | m | — | — | — | — | — | — | 0–1 | — |
| | g | | | | | | | 0–1 | |
| Wet-film adhesion after tropical-climate test | 2 h | — | — | — | — | — | — | 5 | — |
| | 24 h | | | | | | | 0 | |
| | 7 days | | | | | | | 2–3 | |
| Salt spray test after 1 day | m | 0 | 0 | 5 HV | 0 | 0 | 5 HV | 0 | 5 |
| | g | 0 | 0 | 3 HV | 0 | 0 | 1 HV | 0 | 0–1 |
| Salt spray test after 3 days | m | 5 HV | 5 HV | — | 0 | 0 | — | 0 | — |
| | g | 1 HV | 1 HV | | 0 | 0 | | 0 | |
| Salt spray test after 1 week | m | — | — | — | 0 HV | 0 HV | — | 0 HV | — |
| | g | | | | 0 HV | 0 HV | | 0 HV | — |
| Salt spray test after 2 weeks | m | — | — | — | 0 HV | 0 HV | — | 0 HV | — |
| | g | | | | 0 HV | 0 HV | | 0 HV | |
| Salt spray test after 3 weeks | m | — | — | — | 0 HV | 0 HV | — | 0 HV | — |
| | g | | | | 0 HV | 0 HV | | 0 HV | |
| Subcorrosion at scribe | cm | 2 | 1.5 | 2 | 2 | 2 | 2 | 2 | — |
| Rust zone | cm | >8 | 2 | 3 | >8 | 4 | >8 | 6 | — |

1): The rating scale is from 0 = very good to 5 = poor
HV: Loss of adhesion
m: Number of blisters
g: Size of blisters In these tests, system No. 8 was found to be the most suitable, its advantage over Beckopox EP 384w (comparison) is clearly evident. The inadequate adhesion of all the systems, including the comparison, can be improved considerably by the use of different, more suitable additives.

It is clear that systems comprising emulsifiers with high molar mass polyethylene glycol offer by far the best protection against corrosion.

The invention has been described in detail by reference to particularly preferred embodiments and by reference to the non-limiting examples. Those skilled in the art appreciate that various modifications can be made to the invention without significantly departing from the spirit and scope thereof In addition, all of the above-described documents are hereby incorporated by reference herein in their entirety.

What is claimed is:

1. A self-emulsifying epoxy resin (A) prepared by condensation of, in proportions by mass:
   (A-1) from 50 to 95% of one or more epoxide compounds having at least two epoxide groups per molecule and an epoxide group content of from 300 to 11,200 mmol/kg;
   (A-2) from 5 to 50% of an aromatic polyol;
   (A-3) from 0 to 25% of modifying compounds having at least two epoxide-reactive groups; and
   (A-4) from 5 to 25% of an emulsifying product of the condensation of
      (A-4-a) an aliphatic polyol having a weight-average molecular mass $M_W$ of from 200 to 20,000 g/mol, and
      (A-4-b) an epoxide compound having at least two epoxide groups per molecule and an epoxide group content of from 500 to 10,000 mmol/kg,
   wherein the ratio of the number of OH groups to the number of epoxide groups is from 1:4 to 1:10 and the epoxide group content of said condensation products (A-4) is between 100 and 6700 mmol/kg, wherein the resin (A) is prepared by condensation of components (A-1), (A-2) and (A-3) with (A-4) at elevated temperatures in the presence of condensation catalysts.

2. A self-emulsifing epoxy resin (A) as claimed in claim 1, prepared by mixing, in proportions by mass of from 55 to 85% of said epoxide component (A-1), from 15 to 45% of said aromatic polyol component (A-2), from 1 to 10% of said modifying compounds (A-3) and from 10 to 20% of said emulsifier (A-4).

3. A self-emulsifying epoxy resin (A) as claimed in claim 1, whose epoxide group content is from 50 to 2500 mmol/kg.

4. A self-emulsifying epoxy resin as claimed in claim 1, wherein the polyepoxides according to (A-1) and (A-4-b) carry on average more than two epoxide groups per molecule.

5. A self-emulsifying epoxy resin as claimed in claim 1, wherein the polyepoxides according to (A-1) and (A-4-b)

have an epoxide group content of from 500 to 10,000 mmol/kg and are selected from the group consisting of: polyglycidyl ethers of polyhydric alcohols; phenols, their hydrogenation products and novolaks; and polyglycidyl esters of polycarboxylic acids.

6. A self-emulsifying epoxy resin as claimed in claim 1, wherein said aromatic polyols (A-2) are selected from the group consisting of di- and polyhydric phenols, halophenols and novolaks.

7. A self-emulsifying epoxy resin as claimed in claim 1, wherein the compounds (A3) have at least two functional groups selected from the group consisting of hydroxyl, carboxyl, carboxylic anhydride, amino and mercapto groups, said finctional groups being capable of reaction with epoxide groups, and said compounds (A3) being different from the aromatic polyols (A-2).

8. A self-emulsifying epoxy resin as claimed in claim 1, wherein the polyols (A-4-a) are selected from hydrophilic polyether-polyols or hydrophilic polyester-polyols having weight-average molecular masses from 600 to 12,000 g/mol, and wherein said polyether-polyols are polyoxyalkylene glycols having 2 to 4 carbon atoms per alkylene group, the polyoxyalkylene glycols comprising uniform alkylene radicals or mixtures of at least two different alkylene radicals, and wherein said polyester-polyols are prepared by polycondensation of a molar excess of aliphatic diols having 2 to 12 carbon atoms with dicarboxylic acids having 2 to 40 carbon atoms which are selected from aliphatic, cycloaliphatic and aromatic dicarboxylic acids, with the use of hydrophilic oligomeric or polymeric polyoxyalkylene glycols.

9. A self-emulsifying epoxy resin as claimed in claim 1, wherein the polyols (A-4-a) are hydrophilic polyols having weight-average molar masses of from 600 to 12,000 g/mol, the polyols being selected from polyester-polyols, polyacrylate-polyols, polycarbonate-polyols and polyurethane-polyols each of which having a content of from 10 to 5000 mmol/kg of functional groups and which are able to form ions in water.

10. A self-emulsifying epoxy resin as claimed in claim 1, wherein the polyols (A-4-a) are aliphatic polyether-polyols with a proportion by mass of at least 20% of oxyethylene groups in the oxyalkylene groups.

11. A method of maldng a selif-emulsilying epoxy resin, comprising adding to one or more epoxide compounds, a condensation product (A-4) which contains epoxide groups, prepared from:

(A-4-a) an aliphatic polyol having a weight-average molar mass $M_W$ of from 200 to 20,000 g/mol; and (A-4-b) an epoxide compound having at least two epoxide groups per molecule and an epoxide group content of from 500 to 10,000 mmol/kg, wherein the ratio of the number of OH groups to the number of epxide groups is from 1:2 to 1:10, and the epoxide group content of said condensation product (A-4) is between 100 and 6700 mmol/kg.

* * * * *

UNITED STATES PATENT AND TRADEMARK OFFICE
CERTIFICATE OF CORRECTION

PATENT NO. : 5,908,902
DATED : June 1, 1999
INVENTOR(S) : Armin PFEIL et al.

It is certified that error appears in the above-identified patent and that said Letters Patent is hereby corrected as shown below:

On the title page, please delete Section 73 in its entirety and substitute therefor --[73] Assignee: VIANOVA RESINS GMBH, Mainz-Kastel, Germany--.

Signed and Sealed this

Fourteenth Day of March, 2000

Attest:

Q. TODD DICKINSON

Attesting Officer

Commissioner of Patents and Trademarks